United States Patent
Park

(10) Patent No.: US 12,306,680 B2
(45) Date of Patent: May 20, 2025

(54) ELECTRONIC DEVICE INCLUDING CONNECTION MEMBER

(71) Applicant: SAMSUNG ELECTRONICS CO., LTD., Suwon-si (KR)

(72) Inventor: Jeongwon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 18/077,766

(22) Filed: Dec. 8, 2022

(65) Prior Publication Data

US 2023/0213984 A1 Jul. 6, 2023

Related U.S. Application Data

(63) Continuation of application No. PCT/KR2022/016486, filed on Oct. 26, 2022.

(30) Foreign Application Priority Data

Dec. 30, 2021 (KR) .................. 10-2021-0192007

(51) Int. Cl.
*G06F 1/18* (2006.01)
*G02B 27/01* (2006.01)

(52) U.S. Cl.
CPC ......... *G06F 1/182* (2013.01); *G02B 27/0176* (2013.01); *G02B 2027/0178* (2013.01)

(58) Field of Classification Search
CPC .................. G06F 1/16; G06F 1/182–185
USPC ........................... 361/799, 816, 818
See application file for complete search history.

(56) References Cited

U.S. PATENT DOCUMENTS

| | | | | |
|---|---|---|---|---|
| 5,416,273 A | * | 5/1995 | Maciejewski | ........ H02G 15/007 267/74 |
| 6,076,927 A | * | 6/2000 | Owens | ..................... G02C 5/10 351/41 |
| 2011/0282252 A1 | * | 11/2011 | Yoo | .......................... G02C 7/16 601/37 |
| 2014/0028966 A1 | | 1/2014 | Blum et al. | |
| 2015/0123881 A1 | | 5/2015 | Sugihara et al. | |

(Continued)

FOREIGN PATENT DOCUMENTS

| | | |
|---|---|---|
| CN | 112526752 A | 3/2021 |
| JP | 11136598 A | 5/1999 |

(Continued)

OTHER PUBLICATIONS

International Search Report (PCT/ISA/210) issued Feb. 1, 2023 by the International Searching Authority in International Patent Application No. PCT/KR2022/016486.

(Continued)

*Primary Examiner* — Hung S. Bui
(74) *Attorney, Agent, or Firm* — Sughrue Mion, PLLC

(57) ABSTRACT

An electronic device includes a lens frame accommodating a display member, a wearing member connected to the lens frame, a circuit board provided inside the wearing member, a battery provided inside the wearing member, and a connection member including a first end connected to the circuit board, a second end connected to the battery, an elastic member formed of a conductive material, and a wire at least partially surrounded by the elastic member. The battery is electrically connected to the circuit board via the elastic member and the wire.

18 Claims, 10 Drawing Sheets

(56) References Cited

U.S. PATENT DOCUMENTS

| | | | |
|---|---|---|---|
| 2016/0131913 A1 | 5/2016 | Kim et al. | |
| 2016/0255748 A1* | 9/2016 | Kim | G02B 27/017 361/695 |
| 2018/0203239 A1 | 7/2018 | Lee et al. | |
| 2019/0033622 A1 | 1/2019 | Olgun et al. | |
| 2020/0271960 A1* | 8/2020 | Baek | A61B 5/1116 |
| 2020/0355944 A1 | 11/2020 | Jouard et al. | |
| 2021/0026157 A1 | 1/2021 | Muramatsu et al. | |
| 2023/0076226 A1* | 3/2023 | Yang | H01Q 1/38 |

FOREIGN PATENT DOCUMENTS

| | | |
|---|---|---|
| JP | 2017-194711 A | 10/2017 |
| KR | 10-1285364 B1 | 7/2013 |
| KR | 10-2015-0057122 A | 5/2015 |
| KR | 10-2015-0072927 A | 6/2015 |
| KR | 10-2016-0056659 A | 5/2016 |
| KR | 10-2017-0016192 A | 2/2017 |
| KR | 20-2019-0001821 U | 7/2019 |
| KR | 10-2020-0070296 A | 6/2020 |
| WO | 2019181150 A1 | 9/2019 |

OTHER PUBLICATIONS

Written Opinion (PCT/ISA/237) issued Feb. 1, 2023 by the International Searching Authority in International Patent Application No. PCT/KR2022/016486.

Communication issued Mar. 12, 2025 by the European Patent Office in European Patent Application No. 22916347.2.

* cited by examiner

ELECTRONIC DEVICE INCLUDING CONNECTION MEMBER

CROSS-REFERENCE TO RELATED APPLICATION(S)

This application is a continuation of International Application No. PCT/KR2022/016486, filed on Oct. 26, 2022, in the Korean Intellectual Property Receiving Office, which is based on and claims priority to Korean Patent Application No. 10-2021-0192007, filed on Dec. 30, 2021, in the Korean Intellectual Property Office, the disclosures of which are incorporated herein by reference in their entireties.

BACKGROUND

1. Field

The disclosure relates to an electronic device including a connection member. In particular, the disclosure relates to a wearable electronic device including a connection member.

2. Description of Related Art

With the development of electronic and communication technologies, electronic devices may be reduced in size and weight to such an extent that the electronic devices may be used without great inconvenience even when the electronic devices are worn on a user's body. For example, wearable electronic devices, such as a head mounted device (HMD), a smartwatch (or band), a contact lens-type device, a ring-type device, a glove-type device, a shoe-type device, or a clothing-type device, are commercially available. Since the wearable electronic devices are directly worn on a user's body, portability and user accessibility may be improved.

A head mounted device is a device used in the state of being worn on a user's head or face and may provide augmented reality (AR) to the user. For example, a head mounted device providing augmented reality may be implemented in the form of glasses, and may provide information about an object in the form of an image or text to the user in at least a partial space of the user's field of view. The head mounted device may provide virtual reality (VR) to the user. For example, by outputting independent images to the user's both eyes, respectively, and outputting a content provided from an external input to the user in the form of an image or sound, the head mounted device may provide an excellent sensation of immersion.

SUMMARY

Additional aspects will be set forth in part in the description which follows and, in part, will be apparent from the description, or may be learned by practice of the presented embodiments.

According to an embodiment of the disclosure, an electronic device may include a lens frame configured to accommodate a display member, a wearing member connected to the lens frame, a circuit board disposed inside the wearing member, a battery disposed inside the wearing member, and a connection member including a first end connected to the circuit board and a second end connected to the battery, wherein the connection member may include an elastic member formed of a conductive material and a wire at least partially surrounded by the elastic member, and the battery may be electrically connected to the circuit board via the elastic member and the wire.

According to an embodiment of the disclosure, an electronic device may include a housing including a lens frame and a wearing member connected to the lens frame, a circuit board disposed inside the housing, a battery disposed inside the housing, and a connection member connected to the circuit board and the battery, wherein the connection member may include an elastic member including a coil spring and a wire at least partially surrounded by the coil spring and configured to electrically interconnect the battery and the circuit board, and a first ground area of the circuit board and a second ground area of the battery may electrically interconnected by the elastic member.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
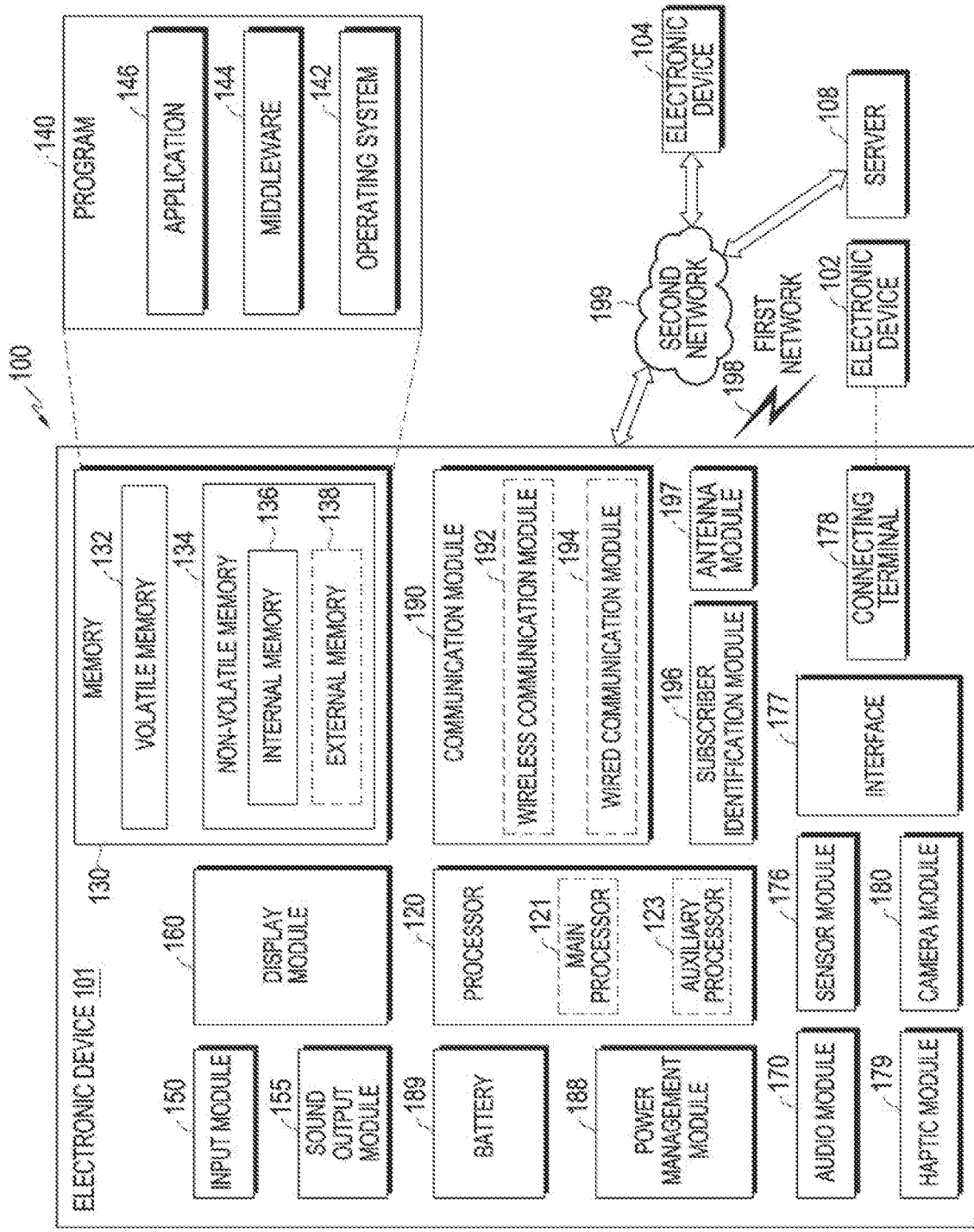
FIG. 1 is a block diagram of an electronic device according to an embodiment of the disclosure in a network environment.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more external devices of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
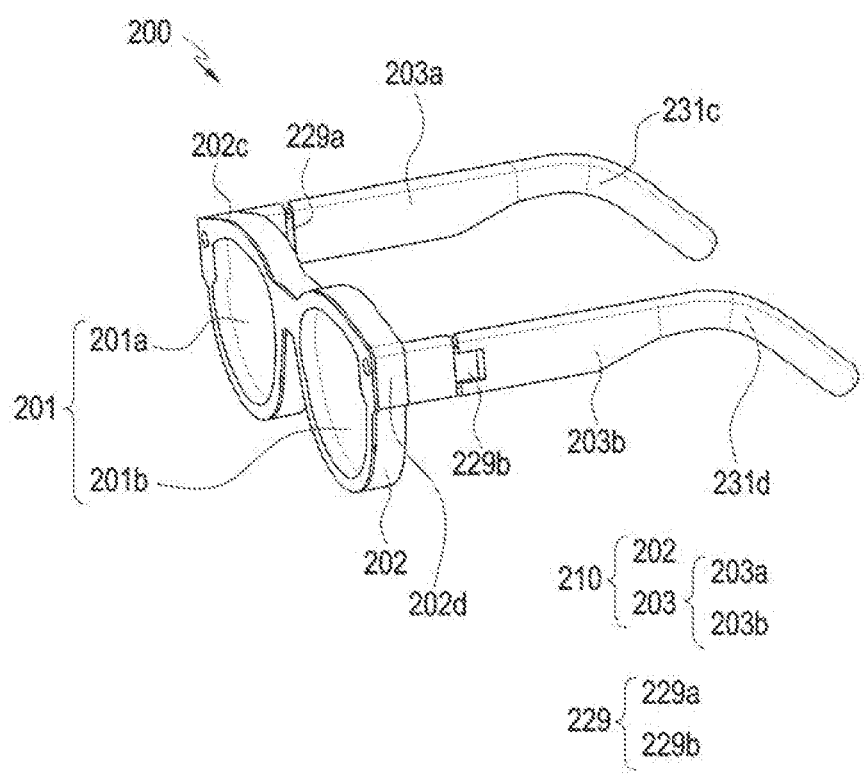
FIG. 2 is a diagram of an electronic device according to an embodiment of the disclosure.

FIG. 2 is a diagram of an electronic device according to an embodiment of the disclosure.

Referring to FIG. 2, the electronic device 200 is a glasses-type wearable electronic device, and a user may visually recognize a surrounding object or environment in the state of wearing the electronic device 200. For example, the electronic device 200 may be a head mounted device (HMD) or smartglasses capable of providing an image directly in front of the user's eyes. The configuration of the electronic device 200 of FIG. 2 may be wholly or partly the same as that of the electronic device 101 of FIG. 1.

According to an embodiment, the electronic device 200 may include a housing 210 that defines the external appearance of the electronic device 200. The housing 210 may provide a space in which components of the electronic device 200 may be disposed. For example, the housing 210 may include a lens frame 202 and one or more wearing members 203.

According to an embodiment, the electronic device 200 may include one or more display members 201 capable of providing visual information to the user. For example, the display members 201 may each include a lens, a display, a waveguide, and/or a module equipped with a touch circuit. According to an embodiment, the display members 201 may be transparent or translucent. According to an embodiment, the display members 201 may each include glass made of a translucent material or a window member the light transmittance of which is adjustable as the color concentration thereof is adjusted. According to an embodiment, a pair of display members 201 may be provided and disposed to correspond to the user's left and light eyes, respectively, in the state in which the electronic device 200 is worn on the user's body. For example, the display members 201 may include a first display member 201a and a second display member 201b disposed to be spaced apart from the first display member 201a. The first display member 201a may be disposed to correspond to the user's right eye, and the second display member 201b may be disposed to correspond to the user's left eye.

According to an embodiment, the lens frame 202 may at least partially accommodate the display members 201. For example, the lens frame 202 may at least partially surround the edges of the display members 201. According to an embodiment, the lens frame 202 may position at least one of the display members 201 to correspond to the user's eyes.

According to an embodiment, the lens frame 202 may be a rim of a general eyeglass structure. According to an embodiment, the lens frame 202 may include one or more closed curves surrounding the display members 201. According to an embodiment, the lens frame 202 may include a first lens frame end 202c and a second lens frame end 202d opposite the first lens frame end 202c. The first lens frame end 202c may be disposed adjacent to a first wearing member 203a, and the second lens frame end 202d may be disposed adjacent to a second wearing member 203b.

According to an embodiment, the wearing members 203 may extend from the lens frame 202. For example, the wearing members 203 may each extend from an end of the lens frame 202 and may be supported or positioned on the user's body (e.g., the ears), together with the lens frame 202. According to an embodiment, the wearing members 203 may each be rotatably coupled to the lens frame 202 via a hinge structure 229. According to an embodiment, the wearing members 203 may each include an inner side surface 231c configured to face the user's body and an outer side surface 231d opposite to the inner side surface. According to an embodiment, the wearing members 203 may be at least partially formed of a flexible material (e.g., rubber). For example, at least a portion of each wearing member 203 may be formed in a band shape surrounding at least a portion of the user's body (e.g., an ear).

According to an embodiment, the wearing members 203 may include a first wearing member 203a and a second wearing member 203b. According to an embodiment, the first wearing member 203a may be connected to the first lens frame end 202c of the lens frame 202, and the second wearing member 203b may be connected to the second lens frame end 202d of the lens frame 202.

According to an embodiment, the electronic device 200 may include hinge structures 229 connected to the wearing members 203 and the lens frame 202. In the state in which the electronic device 200 is not worn, the user may carry or store the electronic device 200 in the state in which the wearing members 203 are folded to partially overlap the lens frame 202 by using the hinge structures 229. According to one embodiment, the hinge structures 229 may include a first hinge structure 229a connected to a portion (e.g., the first lens frame end 202c) of the lens frame 202 and the first wearing member 203a and a second hinge structure 229b connected to a portion (e.g., the second lens frame end 202d) of the lens frame 202 and the second wearing member 203b.

Figure 3:
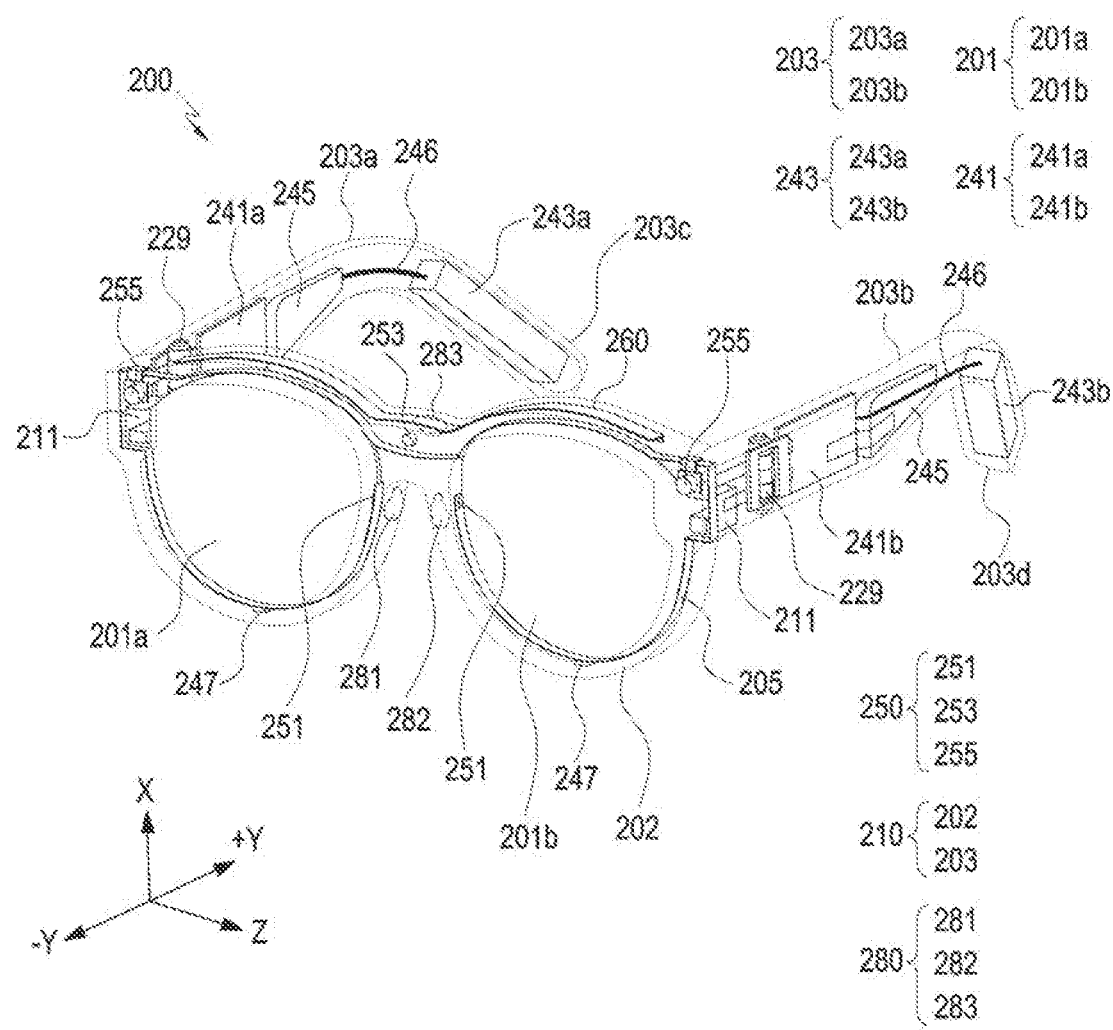
FIG. 3 is a diagram of an internal configuration of an electronic device according to an embodiment of the disclosure.
Figure 4:
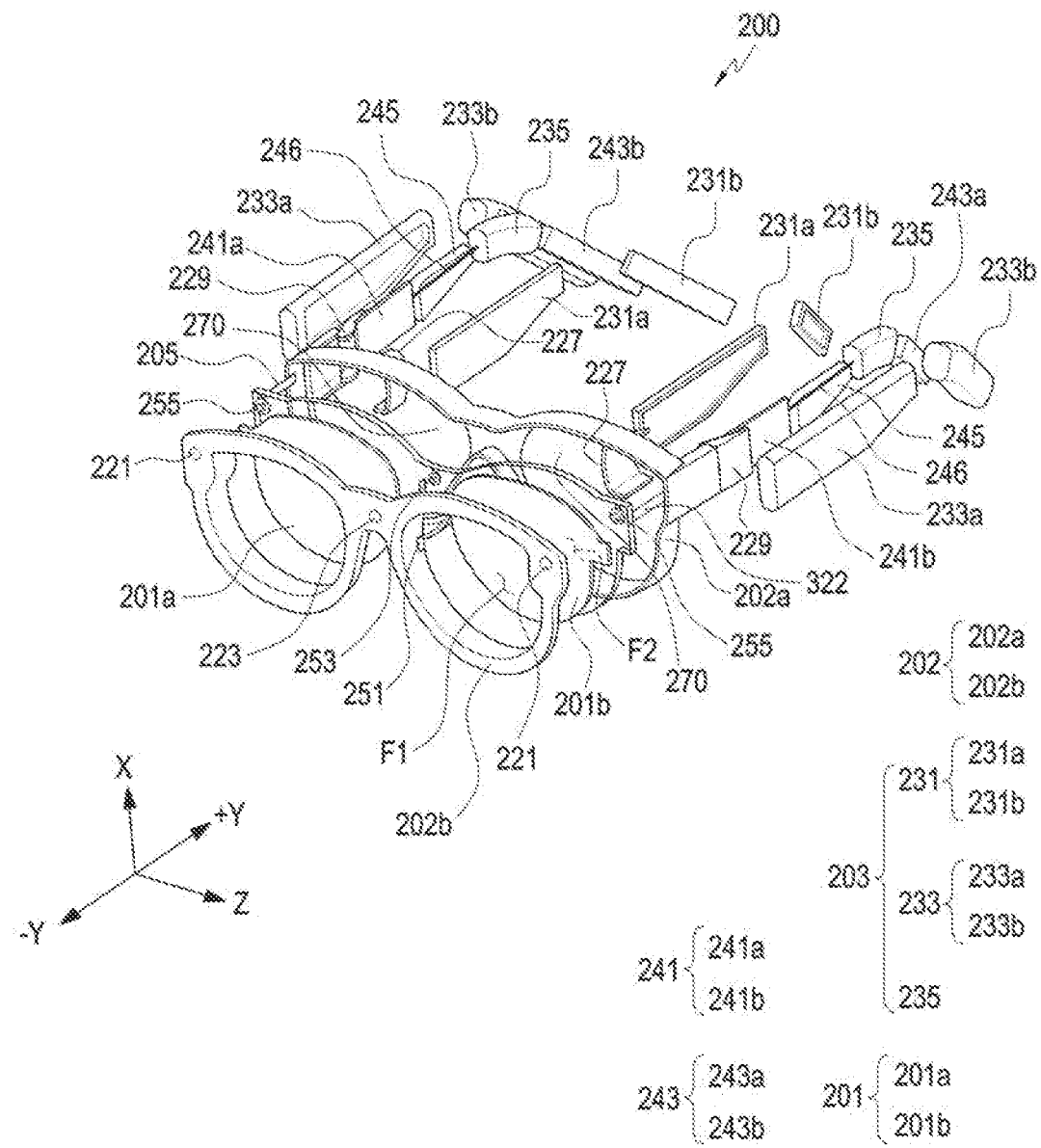
FIG. 4 is a diagram of the electronic device according to an embodiment of the disclosure.

FIG. 3 is a diagram of an internal configuration of an electronic device according to an embodiment of the disclosure. FIG. 4 is a diagram of the electronic device according to an embodiment of the disclosure.

Referring to FIGS. 3 and 4, the electronic device 200 may include display members 201, a lens frame 202, wearing members 203, hinge structures 229, one or more circuit boards 241, one or more batteries 243, one or more power transmission structures 246, a camera modules 250, and sensor modules 280. The configurations of the display members 201, the lens frame 202, the wearing members 203, and the hinge structures 229 of FIG. 3 and/or FIG. 4 may wholly or partly the same as those of the display members 201, the lens frame 202, the wearing members 203, and the hinge structures 229 of FIG. 2.

According to an embodiment, the electronic device 200 may acquire and/or recognize visual images regarding an object or environment in a direction, in which the user gazes or the electronic device 200 is oriented (e.g., the −Y direction) by using the camera modules 250 (e.g., the camera module 180 of FIG. 1) and may receive information about the object or environment from an external electronic device (e.g., the electronic devices 102 and 104 or the server 108 of FIG. 1) via a network (e.g., the first network 198 or the second network 199 of FIG. 1). In another embodiment, the electronic device 200 may provide, to the user, the received information about the object or environment in an acoustic or visual form. The electronic device 200 may provide, to the user, the received information about the object or environment via the display members 201 in a visual form by using a display module (e.g., the display module 160 in FIG. 1). For example, the electronic device 200 may implement augmented reality by implementing the information about the object or environment in a visual form and combining the information with an actual image of the environment around the user.

According to an embodiment, the display member 201 may include a first surface F1 oriented in a direction (e.g., in the −Y direction) in which external light is incident and a second surface F2 facing away from the first surface F1 (e.g., in the +Y direction). In the state in which the user wears the electronic device 200, at least a part of the light or image incident through the first surface F1 may pass through the second surfaces F2 of the display members 201, which are disposed to face the user's left eye and/or right eye to be incident to the user's left eye and/or right eye.

According to an embodiment, the lens frame 202 may include at least two frames. For example, the lens frame 202 may include a first frame 202a and a second frame 202b. According to an embodiment, when the user wears the electronic device 200, the first frame 202a may be a frame of a portion facing the user's face, and the second frame 202b may be a portion of the lens frame 202 spaced apart from the first frame 202a in the user's gazing direction (e.g., the −Y direction).

According to an embodiment, the electronic device 200 may include light output modules 211 configured to provide an image and/or a video to the user. For example, the light output modules 211 may include display panels capable of outputting an image, and lenses corresponding to the user's eyes and configured to guide the image to the display members 201. For example, the user may acquire an image output from the display panels of the light output modules 211 through the lenses of the light output modules 211. According to an embodiment, the light output modules 211 may each include a device configured to display various pieces of information. For example, the light output modules 211 may each include at least one of a liquid crystal display (LCD), a digital mirror device (DMD), a liquid crystal-on-silicon (LCoS) display device, an organic light-emitting diode (OLED), or a micro light-emitting diode (a micro-LED). According to an embodiment, when the light output modules 211 and/or the display members 201 each include one of a liquid crystal display device, a digital mirror display device, or a liquid crystal-on-silicon (LCoS) display device, the electronic device 200 may include light sources configured to emit light to the display areas of the light output modules 211 and/or the display members 201. According to another embodiment, when the light output modules 211 and/or the display members 201 each include one of an organic light emitting diode or a micro-LED, the electronic device 200 may provide a virtual image to the user without including a separate light source.

According to an embodiment, each of the light output modules 211 may be at least partially disposed inside the housing 210. For example, the light output modules 211 may be disposed on the wearing members 203 or the lens frame 202 to correspond to the user's right eye and left eye, respectively. According to an embodiment, the light output modules 211 may be connected to the display members 201, respectively, and may provide an image to the user via the display members 201. For example, an image output from the light output modules 211 is incident on the display members 201 via input optical members located at one ends of the display members 201, and may be emitted to the user's eyes through waveguides and output optical members each of which is located in at least a portion of corresponding one of the display members 201.

According to an embodiment, the electronic device 200 may include circuit boards 241 each of which accommodates components for driving the electronic device 200 (e.g., a printed circuit board (PCB), a printed board assembly (PBA), an FPCB (flexible PCB), or a rigid-flexible PCB (RFPCB). For example, the circuit boards 241 may each include at least one integrated circuit chip, and at least one of the processor 120, the memory 130, the power management module 188, or the communication module 190 of FIG. 1 may be provided in the integrated circuit chip. According to an embodiment, the circuit boards 241 may be disposed in the wearing members 203 of the housing 210, respectively. For example, the circuit boards 241 may include a first circuit board 241a disposed in the first wearing member 203a and a second circuit board 241b disposed in the second wearing member 203b. According to an embodiment, the circuit boards 241 may be electrically connected to the batteries 243 via power transmission structures 246, respectively. According to an embodiment, the circuit boards 241 may be interposer boards.

According to an embodiments, the batteries 243 (e.g., the battery 189 in FIG. 1) may be electrically connected to the components (e.g., the light output modules 211, the circuit boards 241, the speaker modules 245, the microphone modules 247, and/or the camera modules 250) of the electronic device 200, and may supply power to the components of the electronic device 200.

According to various embodiments, the batteries 243 may be at least partially disposed within the wearing members 203, respectively. According to an embodiment, the batteries 243 may include a first battery 243a disposed in the first wearing member 203a and a second battery 243b disposed in the second wearing member 203b. According to an embodiment, the batteries 243 may be disposed adjacent to the ends 203a and 203d of the wearing members 203, respectively.

According to various embodiments, the speaker modules 245 (e.g., the audio module 170 or the sound output module 155 in FIG. 1) may convert an electrical signal into sound. The speaker modules 245 may be at least partially disposed inside the wearing members 203 of the housing 210, respectively. According to an embodiment, the speaker modules 245 may be located in the wearing members 203 to correspond to the user's ears, respectively. According to an embodiment (e.g., FIG. 3), the speaker modules 245 may be disposed next to the circuit boards 241, respectively. For example, the speaker modules 245 may be disposed between the circuit boards 241 and the batteries 243, respectively. According to an embodiment, the speaker modules 245 may be disposed on the circuit boards 241, respectively. For example, the speaker modules 245 may be disposed between the circuit boards 241 and the inner cases (e.g., the inner cases 231 in FIG. 4), respectively.

According to an embodiment, the electronic device 200 may include power transmission structures 246 configured to transmit power of the batteries 243 to electronic components (e.g., the light output modules 211) of the electronic device 200. For example, the power transmission structures 246 may be electrically connected to the batteries 243 and/or the circuit boards 241, and the circuit boards 241 may transmit, to the light output modules 211, respectively, power received via the power transmission structures 246. According to an embodiment, the power transmission structures 246 may have a configuration capable of transmitting power. For example, the power transmission structures 246 may each include a flexible printed circuit board or wire. For example, the wire may include a plurality of cables. In various embodiments, the shape of the power transmission structures 246 may be variously modified in consideration of the number and/or type of cables, or the like.

According to an embodiment, microphone modules 247 (e.g., the input module 150 and/or the audio module 170 in FIG. 1) may convert sound into an electrical signal. According to an embodiment, the microphone modules 247 may be disposed within the lens frame 202. For example, one or more microphone modules 247 may be disposed at the lower end (e.g., in the −X-axis direction) and/or the upper end (e.g., the X-axis direction) of the electronic device 200. According to an embodiment, the electronic device 200 may more clearly recognize the user's voice by using voice information (e.g., sound) acquired from the one or more microphone modules 247. For example, based on the acquired voice information and/or additional information (e.g., low-frequency vibration of the user's skin and bone), the electronic device 200 may distinguish voice information and ambient noise from each other. For example, the electronic device 200 may clearly recognize the user's voice and may perform a function of reducing ambient noise (e.g., noise canceling).

According to an embodiment, the camera modules 250 may capture a still image and/or a video image. The camera modules 250 may each include at least one of a lens, at least one image sensor, an image signal processor, or a flash. According to an embodiment, the camera modules 250 may be disposed in the lens frame 202 and disposed around the display members 201, respectively.

According to an embodiment, the camera modules 250 may include one or more first camera modules 251. According to an embodiment, the first camera modules 251 may image the trajectory of the user's eyes (e.g., pupils) or gaze. For example, the first camera modules 251 may each include a light-emitting unit (e.g., an IR LED) configured to emit light in an infrared band, and a camera structure configured to image a reflection pattern of the light emitted by the light emitting unit to the user's eyes. According to an embodiment, in order to make a virtual image projected to the display members 201 correspond to the direction in which the user's pupils gaze, the processor (e.g., the processor 120 in FIG. 1) may adjust the position of the virtual image. According to an embodiment, the trajectory of the user's eyes or gaze may be tracked by using the plurality of first camera modules 251 having the same standard and performance.

According to various embodiments, the first camera modules 251 may periodically or aperiodically transmit information related to the trajectory of the user's eyes or gaze (e.g., trajectory information) to the processor (e.g., the processor 120 in FIG. 1). According to another embodiment, the first camera modules 251 may transmit the trajectory information to the processor when detecting that the user's gaze has changed based on the trajectory information (e.g., when the eyes have moved more than a reference value in the state in which the head does not move).

According to an embodiment, the camera modules 250 may include a second camera module 253. According to an embodiment, the second camera module 253 may capture an external image. According to an embodiment, the second camera module 253 may capture an external image through a second optical hole 223 provided in the second frame 202b. For example, the second camera module 253 may include a high-resolution color camera and may be a high-resolution (HR) or photo-video (PV) camera. According to an embodiment, the second camera module 253 may provide an auto focus (AF) function and an optical image stabilizer (OIS) function.

According to an embodiment, the electronic device 200 may include a flash located adjacent to the second camera module 253. For example, the flash may provide light for increasing the brightness (e.g., illuminance) around the electronic device 200 when acquiring an external image of the second camera module 253, and may reduce difficulty of acquiring an image due to a dark environment, mixing of various light sources, and/or reflection of light.

According to an embodiment, the camera modules 250 may include one or more third camera modules 255. According to an embodiment, the third camera modules 255 may image a user's motion through the first optical holes 221 provided in the lens frame 202. For example, the third camera modules 255 may image the user's gesture (e.g., a hand gesture). The third camera modules 255 and/or first optical holes 221 may be disposed respective at the opposite ends of the lens frame 202 (e.g., the second frame 202b) (e.g., the opposite ends of the lens frame 202 (e.g., the second frame 202b) in the X direction). According to an embodiment, the third camera modules 255 may be global shutter (GS) type cameras. For example, the third camera modules 255 may provide 360-degree spatial (e.g., omnidirectional) or positional recognition and/or movement recognition using cameras that support 3 degrees of freedom (DoF) or 6 DoF. According to an embodiment, the third camera modules 255 may perform a movement path tracking function (simultaneous localization and mapping (SLAM)) and a user movement recognition function using a plurality of global shutter type cameras of the same standard and performance as stereo cameras. According to an embodiment, the third camera modules 255 may each include an infrared (IR) camera (e.g., a time of flight (ToF) camera or a structured light camera). For example, the IR camera may be operated as at least a portion of a sensor module (e.g., the sensor module 176 in FIG. 1) for detecting a distance to a subject.

According to an embodiment, at least one of the first camera modules 251 and the third camera modules 255 may be replaced with a sensor module (e.g., the sensor module 176 in FIG. 1). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be interpreted as a photo detector or a photo sensor.

According to an embodiment, at least one of the first camera modules 251, the second camera module 253, or the third camera modules 255 may include a plurality of camera modules. For example, the second camera module 253 may include a plurality of lenses (e.g., wide-angle and telephoto lenses) and image sensors, and may be disposed on one surface (e.g., the surface oriented in the −Y-axis direction) of the electronic device 200. For example, the electronic device 200 may include a plurality of camera modules having different attributes (e.g., angles of view) or functions, respectively, and may control the camera modules to change the angles of view thereof based on the user's selection and/or trajectory information. For example, at least one of the plurality of camera modules may be a wide-angle camera, and at least another one of the camera modules may be a telephoto camera.

According to various embodiments, the processor (e.g., the processor 120 in FIG. 1) may determine the movement of the electronic device 200 and/or the user's movement using the information of the electronic device 200 acquired by using at least one of the gesture sensor, the gyro sensor, or the acceleration sensor of the sensor module (e.g., the sensor module 176 in FIG. 1) and the user's movement (e.g., the approach of the user's body to the electronic device 200) acquired by using the third camera modules 255. According to an embodiment, in addition to the above-described sensors, the electronic device 200 may include a magnetic (geomagnetic) sensor capable of measuring an azimuth using a magnetic field and a line of magnetic force and/or a Hall sensor capable of acquiring movement information (e.g., a movement direction or a movement distance) using the intensity of the magnetic field. For example, the processor may determine the movement of the electronic device 200 and/or the movement of the user based on information acquired from a magnetic (geomagnetic) sensor and/or a Hall sensor.

According to various embodiments, the electronic device 200 may perform an input function (e.g., a touch and/or a pressure detection function) capable of interacting with the user. For example, components configured to perform a touch and/or a pressure detection function (e.g., a touch sensor and/or a pressure sensor) may be disposed on at least a portion of the wearing members 203. The electronic device 200 may control a virtual image output through the display members 201 based on the information acquired via the components. For example, the sensors related to a touch detection function and/or a pressure detection function may be configured in various types, such as a resistive type, a capacitive type, an electro-magnetic (EM) type, or an optical type. According to an embodiment, all or some of the components configured to perform a touch detection function and/or a pressure detection function may be the same as those of the input module 150 of FIG. 1.

According to an embodiment, the electronic device 200 may include lens structures 270. The lens structures 270 may refract at least a part of light. For example, the lens structures 270 may be prescription lenses having a specified refractive power. According to an embodiment, the lens structures 270 may be at least partially disposed behind the window member of the display members 201 (e.g., in the +Y direction). For example, the lens structures 270 may be located between the display members 201 and the user's eyes.

According to an embodiment, the housing 210 may include hinge covers 227 capable of partially concealing the hinge structures 229, respectively. The other portions of the hinge structures 229 may be accommodated or concealed between inner cases 231 and outer cases 233, which will be described later.

According to an embodiment, the wearing members 203 may each include an inner case 231 and an outer case 233. The inner case 231 is, for example, a case configured to face the user's body or to come into direct contact with the user's body, and may be made of a material having a low thermal conductivity (e.g., a synthetic resin). According to an embodiment, the inner case 231 may include an inner side surface (e.g., the inner side surface 231c in FIG. 2) facing the user's body. The outer cases 233 may include, for example, a material (e.g., a metal material) capable of at least partially transferring heat, and may be coupled to face the inner cases 231, respectively. According to an embodiment, the outer cases 233 may each include an outer side surface (e.g., the outer side surface 231d in FIG. 2) opposite to the inner side surface 231c. In an embodiment, at least one of the circuit boards 241 or the speaker modules 245 may be accommodated in a space separated from the battery 243 within the wearing member 203. In the illustrated embodiment, the inner cases 231 may include a first case 231a including a circuit board 241 and/or a speaker module 245 and a second case 231b configured to accommodate a battery 243, and the outer cases 233 may include a third case 233a coupled to face the first case 231a and a fourth case 233b coupled to face the second case 231b. For example, the first case 231a and the third case 233a (hereinafter, "first case parts 231a and 233a") may be coupled to accommodate the circuit board 241 and/or the speaker module 245, and the second case 231b and the fourth case 233b (hereinafter, "second case parts 231b and 233b") may be coupled to accommodate the battery 243.

According to various embodiments, the first case parts 231a and 233a may be rotatably coupled to the lens frame 202 via the hinge structures 229, and the second case parts 231b and 233b may be connected to or mounted on the ends of the first case parts 231a and 233a via the connection structures 235. In some embodiments, the portions of the connection structures 235 that come into contact with the user's body may be made of a material having low thermal conductivity (e.g., an elastic material such as silicone, polyurethane, or rubber), and the portions that do not come into contact with the user's body may be made of a material having a high thermal conductivity (e.g., a metal material). For example, when heat is generated from the circuit boards 241 or the batteries 243, the connection structures 235 block heat from being transferred to portions that come into contact with the user's body, and may distribute or release heat through the portions that do not come into contact with the user's body. According to an embodiment, the portions of the connection structures 235 that are configured to come into contact with the user's body may be interpreted as portions of the inner cases 231, and the portions of the connection structures 235 that do not come into contact with the user's body may be interpreted as portions of the outer cases 233. According to an embodiment, the first case 231a and the second case 231b may be integrally configured without a connection structure 235, and the third case 233a and the fourth case 233b may be integrally configured without a connection structure 235. According to various embodiments, in addition to the illustrated components, other components (e.g., the antenna module 197 of FIG. 1) may be further included, and information about an object or environment may be provided from an external electronic device (e.g., the electronic device 102 or 104 or the server 108 in FIG. 1) by using a communication module 190 via a network (e.g., the first network 198 or the second network 199 in FIG. 1). According to an embodiment, the connection structures 235 may be formed of a flexible material (e.g., rubber and/or silicone). For example, the shape of the connection structures 235 may be deformed to correspond to the user's body. According to an embodiment, each connection structure 235 may accommodate at least a portion of a connection member (e.g., the connection member 300 in FIG. 5).

According to an embodiment, the sensor module 280 (e.g., the sensor module 176 in FIG. 1) may detect light passing through the display members 201. According to an embodiment, the sensor module 280 may include a first sensor module 281 capable of detecting light passing through the first display member 201a, and a second sensor module 282 capable of detecting light passing through the second display member 201b. For example, the first sensor module 281 may detect light at the rear side (e.g., +Y direction) of the first display member 201a, and the second sensor module 282 may detect light at the rear side of the second display member 201b. According to an embodiment, the sensor modules 280 may include a third sensor module 283 capable of detecting light at the front side (e.g., −Y direction) of the display members 201. For example, the third sensor module 283 may detect light at the front side (e.g., −Y direction) of the display members 201. According to an embodiment, the sensor modules 280 may be illuminance sensors. According to an embodiment, the configuration of the third sensor module 283 be wholly or partly the same as that of the second camera module 253.

Figure 5:
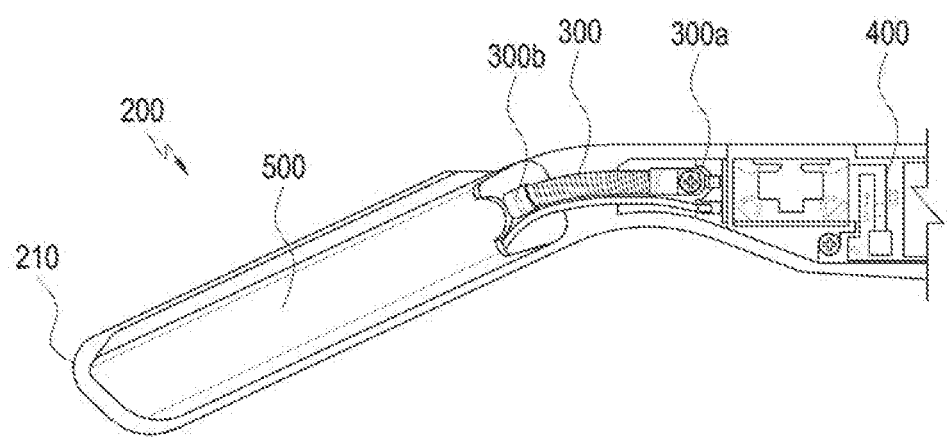
FIG. 5 is a diagram of the internal structure of the electronic device according to an embodiment of the disclosure.
Figure 6:
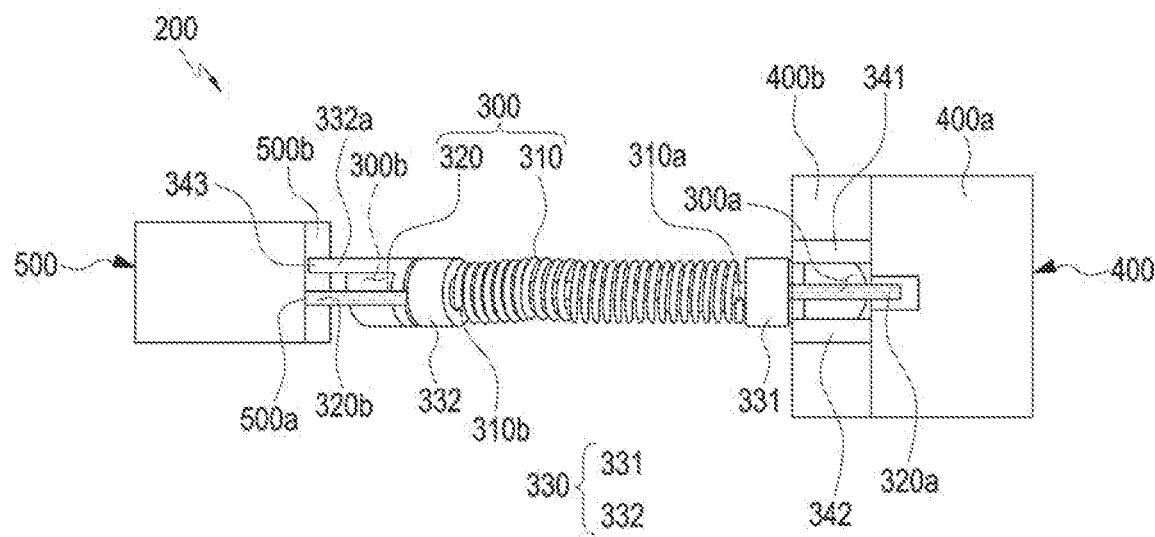
FIG. 6 is a diagram of the electronic device including a connection member according to an embodiment of the disclosure.
Figure 7:
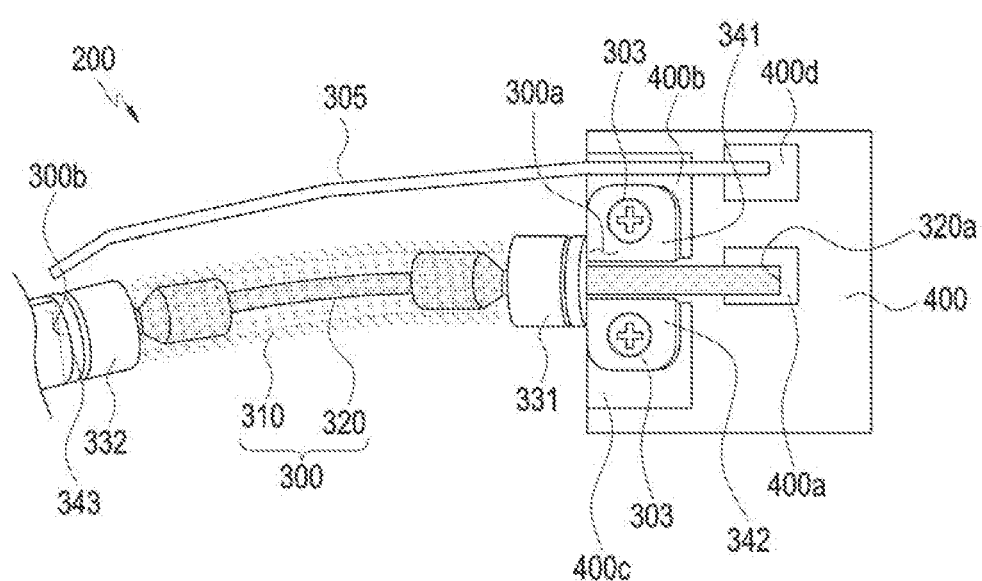
FIG. 7 is a diagram of an electrical connection structure between the connection member and a circuit board according to an embodiment of the disclosure.

FIG. 5 is a diagram of the internal structure of the electronic device according to an embodiment of the disclosure. FIG. 6 is a diagram of the electronic device including a connection member according to an embodiment of the disclosure. FIG. 7 is a diagram of an electrical connection structure between the connection member and a circuit board according to an embodiment of the disclosure.

Referring to FIGS. 5 to 7, the electronic device 200 may include a housing 210, a connection member 300, a circuit board 400, and a battery 500. The configurations of the housing 210, the circuit board 400, and the battery 500 of FIG. 5 may be wholly or partly the same as those of the housing 210, the circuit board 241, and the battery 243 of FIGS. 3 and 4.

According to an embodiment, the connection member 300 may interconnect the circuit board 400 and the battery 500.

According to an embodiment, the connection member 300 may electrically interconnect the circuit board 400 and the battery 500. For example, at least some of the current output from the battery 500 may be transmitted to the circuit board 400 via the connection member 300. For example, the battery 500 may be electrically connected to a processor (e.g., the processor 120 in FIG. 1) and/or a power management module (e.g., the power management module 186 in FIG. 1) located on the circuit board 400 via the connection member 300. As another example, the circuit board 400 and/or the battery 500 may each operate as a ground that provides a reference potential. The current of the circuit board 400 may flow to the battery 500 via the connection member 300.

According to an embodiment, the shape of at least a portion of the housing 210 of the electronic device 200 may be changed. For example, when the electronic device 200 is mounted on a user, at least a portion of the connection structure (e.g., the connection structure 235 in FIG. 4) may be bent to increase user convenience.

According to an embodiment, at least a portion of the connection member 300 may be disposed in the connection structure 235. At least a portion of the connection member 300 may be deformed or bent together with the connection structure 235. According to an embodiment, the connection member 300 may be referred to as a goose neck hinge and/or a bellows structure.

According to an embodiment, the connection member 300 may mechanically interconnect the circuit board 400 and the battery 500. For example, the connection member 300 may include a first end 300a connected to the circuit board 400 and a second end 300b located opposite to the first end 300a and connected to the battery 500. According to an embodiment, the connection member 300 may be disposed in the housing 210. For example, at least a portion of the connection member 300 may be accommodated in the connection structure (e.g., the connection structure 235 in FIG. 4) of the housing 210.

According to an embodiment, the connection member 300 may include an elastic member 310 and a wire 320. The configuration of the wire 320 may be wholly or partly the same as the configuration of the power transmission structure 246 of FIG. 3 and/or FIG. 4. According to an embodiment, the wire 320 may have various shapes according to the design of the electronic device 200.

According to an embodiment, the elastic member 310 may electrically interconnect the circuit board 400 and the battery 500. For example, at least a portion of the elastic member 310 may be formed of a conductive material. According to an embodiment, at least some of the current of the circuit board 400 may flow to the battery 500 via the elastic member 310, or at least some of the current of the battery 500 may flow to the circuit board 400 via the elastic member 310.

According to an embodiment, the elastic member 310 may protect the wire 320 from an external impact. For example, the elastic member 310 may surround at least a portion of the wire 320. According to an embodiment, the elastic member 310 may be a coil spring.

According to an embodiment, the elastic member 310 may include a third end 310a facing the circuit board 400 and a fourth end 310b located opposite to the third end 310a and facing the battery 500.

According to an embodiment, the wire 320 may electrically interconnect the circuit board 400 and the battery 500. For example, the current output from the battery 500 may be transmitted to the circuit board 400 via the wire 320. The wire 320 may include a fifth end 320a connected to a first power terminal 400a of the circuit board 400 and a sixth end 320b located opposite to the fifth end 320a and connected to a second power terminal 500a of the battery 500. According to an embodiment, a power management module (e.g., the power management module 188 in FIG. 1) may be disposed on the circuit board 400 and may be electrically connected to the first power terminal 400a. For example, the power management module 188 may be electrically connected to the battery 500 via the first power terminal 400a, the wire 320, and the second power terminal 500a.

According to an embodiment, the wire 320 may mechanically interconnect the circuit board 400 and the battery 500. For example, the wire 320 may include a flexible conductive material (e.g., metal).

According to an embodiment, at least a portion of the wire 320 may be located inside the elastic member 310. For example, at least a portion of the wire 320 may be surrounded by the elastic member 310.

According to an embodiment, the elastic member 310 and the wire 320 may be electrically separated from each other. For example, the wire 320 may include an insulating coating forming at least a portion of an outer circumferential surface of the wire 320. According to an embodiment, the insulating coating may be referred to as a sheath surrounding an internal wire that provides a path for current to flow. According to an embodiment, the wire 320 may include at least one conductive line. For example, the wire 320 may include at least one conductive line and an insulating coating surrounding the at least one conductive line.

According to an embodiment, the connection member 300 may include a conductive member 330 connected to the elastic member 310. For example, the conductive member 330 may include a first conductive member 331 electrically connected to the third end 310a of the elastic member 310 and a second conductive member 332 electrically connected to the fourth end 310b of the elastic member 310. The first conductive member 331 may be disposed between the elastic member 310 and the circuit board 400. The second conductive member 332 may be disposed between the elastic member 310 and the battery 500. According to an embodiment, the conductive member 330 may surround at least a portion of the wire 320.

Referring to FIGS. 6 and 7, the connection member 300 may include first conductive plates 341 and 342 extending from the first conductive member 331. The first conductive plates 341 and 342 may be connected to a first ground area 400b, 400c of the circuit board 400. The first conductive plates 341 and 342 may include a first plate 341 and a second plate 342 spaced apart from the first plate 341. According to an embodiment, the wire 320 may be located between the first plate 341 and the second plate 342. The first ground area 400b, 400c may be interpreted as a metal and/or conductive portion of the circuit board 400 for providing a reference potential.

According to an embodiment, the conductive member 300 may include a second conductive plate 343 extending from the second conductive member 332. The second conductive plate 343 may be connected to a second ground area 500b of the battery 500. The second ground area 500b may be interpreted as a metal and/or conductive portion of the battery 500 for providing a reference potential. According to an embodiment, the first ground area 400b and the second ground area 500b may function as a single ground due to the connection member 300.

According to an embodiment, the conductive member 330 may provide a path through which current flows, together with the elastic member 310. For example, the circuit board 400 may be electrically connected to the battery 500 via the first conductive member 331, the elastic member 310, and the second conductive member 332. According to an embodiment, the current of the circuit board 400 may flow to the battery 500 via the first conductive plate 341, the first conductive member 331, the elastic member 310, the second conductive member 332, and the second conductive plate 343. The electronic device 200 may use, as a ground structure, the second ground area 500b of the battery 500 together with the first ground area 400b of the printed circuit board 400. The ground structure may be referred to as a ground or an earth.

According to an embodiment, the first end 300a of the connection member 300 may include the first conductive plate 341, the second conductive plate 342, and/or a third end 320a of the wire 320. According to an embodiment, the second end 300b of the connection member 300 may include a fourth end 320b of the wire 320 and/or the second conductive plate 343.

According to an embodiment, the electronic device 200 may include a cable structure 305 spaced apart from the connection member 300. The cable structure 305 may be electrically connected to a connection terminal for charging the electronic device 200 (e.g., the connection terminal 307 in FIG. 10) and the circuit board 400. For example, an electrical signal and/or current acquired from an external electronic device by using the connection terminal 307 may be transmitted to the circuit board 400 and/or the battery 500. According to an embodiment, at least a portion of the cable structure 305 may be arranged in substantially parallel to at least a portion of the wire 320.

According to an embodiment, the connection member 300 may include at least one fastening member 303 for connecting or fixing a plate (e.g., the first conductive plate 341 and/or the second conductive plate 343) to the circuit board 400. The fastening member 303 may have a screw or boss structure.

In FIG. 5, the connection member 300 is illustrated as being located in the housing 210 between the circuit board 400 and the battery 500, but the position of the connection member 300 is not limited thereto. According to an embodiment, the connection member 300 may be located inside the housing 210 and may mechanically and/or electrically connect the components of the electronic device 200. For example, the connection member 300 may be located inside the housing 210 corresponding to the hinge structure (e.g., the hinge structure 229 in FIG. 2). According to an embodiment, the connection member 300 may be electrically connected the battery 500 via to a circuit board (e.g., the first circuit board 241a and/or the second circuit board 241b of FIG. 4) without being directly connected to the battery 500.

According to an embodiment, the shape and/or structure of the second end 300b may correspond to the shape and/or structure of the first end 300a. For example, the structure of the second conductive plate 343 of the second end 300b may be substantially the same as that of the first conductive plates 341 and 342 of the first end 300a.

Figure 8:
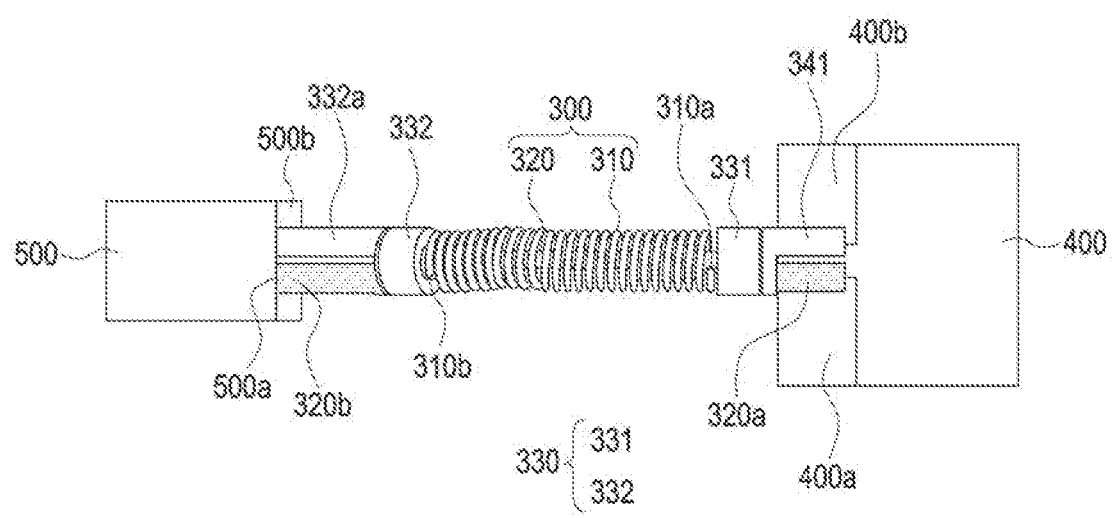
FIG. 8 is a diagram of an electronic device including a connection member according to an embodiment of the disclosure.
Figure 9:
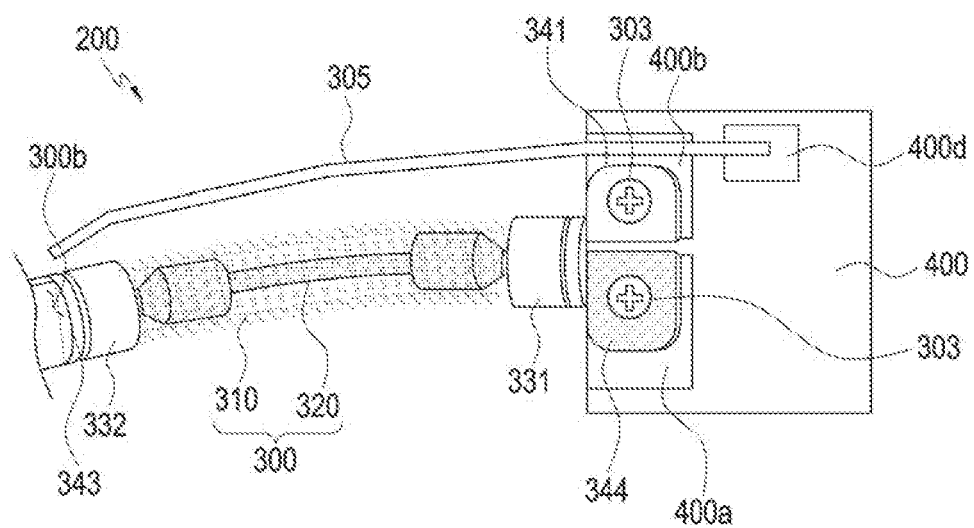
FIG. 9 is a diagram of an electrical connection structure between the connection member and the circuit board of FIG. 8 according to an embodiment of the disclosure.

FIG. 8 is a diagram of an electronic device including a connection member according to an embodiment of the disclosure. FIG. 9 is a diagram of an electrical connection structure between the connection member and the circuit board of FIG. 8 according to an embodiment of the disclosure.

Referring to FIGS. 8 and 9, the electronic device 200 may include a connection member 300, a fastening member 303, a cable structure 305, a circuit board 400, and a battery 500. The configurations of the connection structure 300, the fastening member 303, the cable structure 305, the circuit board 400, and the battery 500 of FIG. 8 and/or FIG. 9 are wholly or partly the same as those of the connection member 300, the fastening member 303, the cable structure 305, the circuit board 400, and the battery 500 of FIG. 7 and/or FIG. 8.

According to an embodiment, the connection member 300 may include a third plate 344. The third plate 344 may be electrically connected to the wire 320. For example, the third plate 344 may be interpreted as a conductive metal extending from the wire 320. According to an embodiment, the current output from the battery 500 may be transmitted to the first power terminal 400a of the circuit board 400 via the wire 320 and the third plate 344. According to an embodiment, the third plate 344 may not be electrically connected to the elastic member 310, the first conductive member 331, and the first conductive plate 341.

Figure 10:
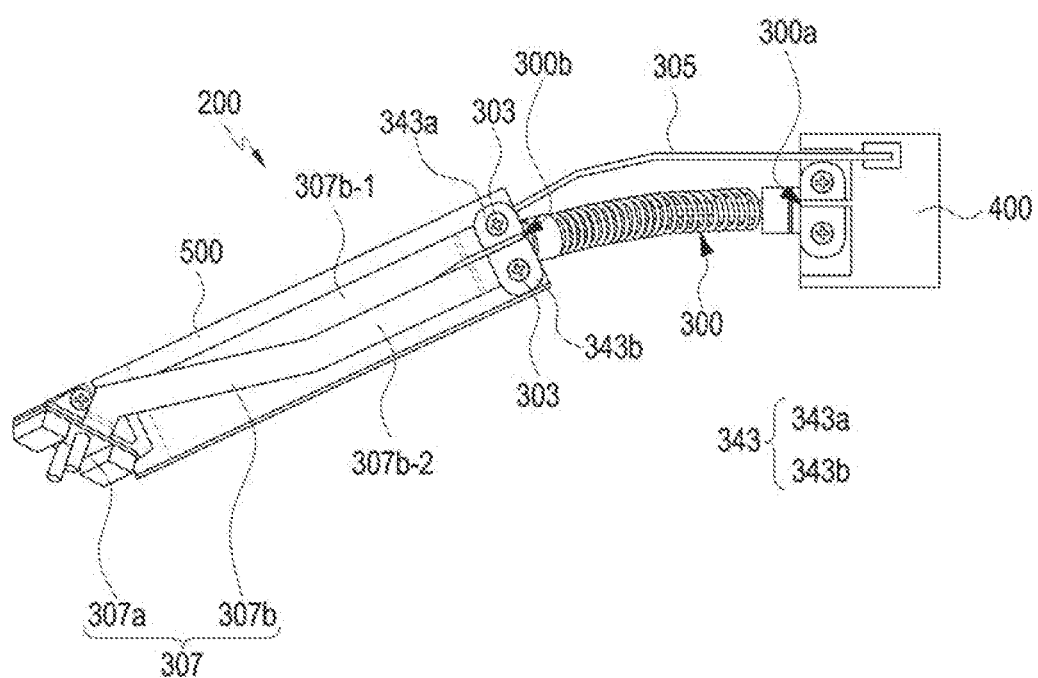
FIG. 10 is a diagram of an electronic device including a connection member and a connection terminal according to an embodiment of the disclosure.

FIG. 10 is a diagram of an electronic device including a connection member and a connection terminal according to an embodiment of the disclosure.

Referring to FIG. 10, the electronic device 200 may include a connection member 300, a cable structure 305, a circuit board 400, and a battery 500. The configurations of the connection structure 300, the cable structure 305, the circuit board 400, and the battery 500 of FIG. 10 are wholly or partly the same as those of the connection member 300, the fastening member 303, the cable structure 305, the circuit board 400, and the battery 500 of FIG. 6 and/or FIG. 7.

According to an embodiment, the electronic device 200 may include a connection terminal 307. According to an embodiment, the connection terminal 307 may include a pin structure 307a to be connected to an external electronic device (e.g., a charging cable or a charging case) and a transmission member 307b electrically connected to the pin structure 307a. According to an embodiment, the pin structure 307a may include an elastic body (e.g., a spring) and a barrel structure that is at least partially compressible. For example, the fin structure 307a may be referred to as a pogo pin. According to an embodiment, the transmission member 307b may provide a path for transmitting current and/or an electrical signal acquired from the pin structure 307a to the battery 500, a processor (e.g., the processor 120 in FIG. 1) located on the circuit board 400, and/or a power management module (e.g., the power management module 188 in FIG. 1). The transmission member 307b may include a flexible printed circuit board and/or a cable. According to an embodiment, the current and/or electrical signal acquired from the connection terminal 307 may be transmitted to the circuit board 400 via the connection member 300 and/or the cable structure 305.

According to an embodiment, the electronic device 200 may include a coil structure received from an external electronic device. The coil structure may be a coil for wireless charging. For example, the coil structure may generate an induced current based on a magnetic field transmitted from an external electronic device. Induced current generated in the coil structure may be transmitted to the circuit board 400 by using the transmission member 307b. According to an embodiment, the current generated in the coil structure may be transmitted to the circuit board 400 via the connection member 300 and/or the cable structure 305.

According to an embodiment, the first end 300a of the connection member 300 may be connected to the circuit board 400, and the second end 300b may be connected to the battery 500 and/or the connection terminal 307. According to an embodiment, the second end 300b may include a second conductive plate 343 electrically connected to the connection terminal 307. For example, the connection terminal 307 may include a first transmission member 307b-1 configured to transmit current and/or an electrical signal, and a second transmission member 307b-2 configured to transmit current and/or an electrical signal and electrically separated from the first transmission member 307b-1. The connection member 300 may include a first conductive plate 343a electrically connected to the first transmission member 307b-1 and a 2nd conductive plate 343b electrically connected to the second transmission member 307b-2. According to an embodiment, the second end 300b may be connected to the battery 500 through at least one fastening member 303.

According to an embodiment, the component to which the connection member 300 is connected is not limited to the battery 500. For example, the connection member 300 may electrically connect components of the electronic device 200. According to an embodiment, the connection member 300 may electrically interconnect a first circuit board (e.g., the first circuit board 241a in FIG. 4) and a second circuit board (e.g., the second circuit board 241b in FIG. 4)). According to an embodiment, the connection member 300 may electrically connect the wireless communication module (e.g., the wireless communication module 192 in FIG. 1) and/or the antenna module (e.g., the antenna module 197 of FIG. 1). According to an embodiment, the connection member 300 may be electrically connected to a connection terminal (e.g., the connection terminal 178 in FIG. 1), and the electronic device 200 may be electrically connected to an external electronic device by using the connection terminal 178 and the connection member 300.

An electronic device according to an embodiment of the disclosure may increase a grounding area by using a wire and a connection member including an elastic member surrounding the wire. By increasing the ground area, a voltage drop may be reduced, and stability of power supply may be increased.

In the electronic device according to an embodiment of the disclosure, a wire positioned inside the elastic member of the connection member may be used as a power transmission path. By disposing the wire in the elastic member, an internal space usable in the electronic device may be increased.

According to an embodiment of the disclosure, an electronic device (e.g., the electronic device 200 in FIG. 2) may include a lens frame (e.g., the lens frame 202 in FIG. 2) configured to accommodate a display member (e.g., the display member 201 in FIG. 2), a wearing member (e.g., the wearing member 203 in FIG. 2) connected to the lens frame, a circuit board disposed in the wearing member (e.g., the circuit board 400 in FIG. 5), a battery (e.g., battery 500 in FIG. 5) disposed therein, where the connection member may include a first end coupled to the circuit board (e.g., first end 300a in FIG. 5) and a second end (e.g., the second end 300b in FIG. 5) coupled to the battery, where the connection member may include an elastic member (e.g., the elastic member 310 in FIG. 6) formed of a conductive material and a wire (e.g., the wire 320 in FIG. 6) at least partially surrounded by the elastic member, and the battery may be electrically connected to the circuit board via the elastic member and the wire.

According to an embodiment, the circuit board may include a first ground area (e.g., the first ground area 400b of FIG. 6), the battery may include a second ground area (e.g., the second ground area 500b in FIG. 6), and the connection member may interconnect the first ground area and the second ground area.

According to an embodiment, the electronic device may further include a power management module (e.g., the power management module 188 in FIG. 1) disposed on the circuit board, where the elastic member may be electrically connected to the first ground area and the second ground area, and the wire may be electrically connected to the power management module and the battery.

According to an embodiment, the connection member may include a first conductive member (e.g., the first conductive member 331 in FIG. 6) connected to a third end (e.g., the third end 310a in FIG. 6) of the elastic member, and a second conductive member (e.g., the second conductive member 332 in FIG. 6) connected to a fourth end (e.g., fourth end 310b in FIG. 6) of the elastic member opposite the third end.

According to an embodiment, the connection member may include a first conductive plate (e.g., the first conductive plates 341 and 342 in FIG. 6) extending from the first conductive member and connected to a first ground area (e.g., the first ground area 400b in FIG. 6) of the circuit board, and a second conductive plate (e.g., the second conductive plate 343 of FIG. 6) extending from the second conductive member and connected to a second ground area (e.g., the second ground area 500b of FIG. 6) of the battery.

According to an embodiment, the first conductive plate may include a first plate (e.g., the first plate 341 in FIG. 7) and a second plate (e.g., the second plate 342 in FIG. 7) spaced apart from the first plate, and the wire may be disposed between the first plate and the second plate.

According to an embodiment, the connection member may include a third conductive plate (e.g., the third conductive plate 344 in FIG. 9) extending from the wire and connected to the first ground area.

According to an embodiment, the elastic member may be electrically connected to the first conductive plate and the second conductive plate, and the wire is insulated from the first plate and the second conductive plate.

According to an embodiment, the wire may be configured to transmit the power of the battery to the circuit board, and the circuit board may be configured to cause the current to flow to the battery via the elastic member.

According to an embodiment, the wearing member may include a first case portion (e.g., the first case portions 231a and 233a in FIG. 4) configured to accommodate the circuit board, a second case portion (e.g., the second case portions 231b and 233b in FIG. 4) configured to accommodating the battery, and a connection structure (e.g., the connection structure 235 in FIG. 4) configured to interconnect the first case portion and the second case portion and accommodate at least a portion of the connection member.

According to an embodiment, the connection structure may be formed of a flexible material.

According to an embodiment, the elastic member may be a coil spring.

According to an embodiment, the electronic device may further include a connection terminal (e.g., the connection terminal 307 in FIG. 10) configured to receive power from an external electronic device.

According to an embodiment, the electronic device may further include a cable structure (e.g., the cable structure 305 in FIG. 10) configured to electrically interconnect the circuit board and the connection terminal and at least partially arranged in parallel with the connection member.

According to an embodiment, the electronic device may further include a light output module (e.g., the light output module 211 of FIG. 3) configured to output an image by using the display member.

According to an embodiment of the disclosure, an electronic device (e.g., the electronic device 200 in FIG. 2) may include a housing (e.g., the housing 210 in FIG. 2) including a lens frame (e.g., the lens frame 202 in FIG. 2) and a wearing member (e.g., the wearing member 203 in FIG. 2) connected to the lens frame, a circuit board (e.g., the circuit board 241 in FIG. 3) disposed in the housing, a battery (e.g., the battery 243 in FIG. 3) disposed in the housing, and a connection member (e.g., the connection member 300 of FIG. 5) connected to the circuit board and the battery, where the connection member may include an elastic member including a coil member (e.g., the elastic member 310 in FIG. 7) and a wire (e.g., the wire 320 in FIG. 7) at least partially surrounded by the coil spring and configured to electrically interconnect the battery and the circuit board, and a first ground area (e.g., the first ground area 400b in FIG. 7) of the circuit board and a second ground area (e.g., the second ground area 500b in FIG. 6) of the battery may be electrically connected by the elastic member.

According to an embodiment, the connection member may include a first conductive member (e.g., the first conductive member 331 in FIG. 5) connected to one end (e.g., the first end 310a in FIG. 6) of the elastic member, and a second conductive member (e.g., the second conductive member 332 in FIG. 5) connected to the other end of the elastic member (e.g., the second end 310b of FIG. 6).

According to an embodiment, the connection member may include a first conductive plate (e.g., the first conductive plates 341 and 342 in FIG. 7) extending from the first conductive member and connected to a first ground area (e.g., the first ground area 400b in FIG. 6) of the circuit board, and a second conductive plate (e.g., the second conductive plate 343 of FIG. 7) extending from the second conductive member and connected to a second ground area (e.g., the second ground area 400b of FIG. 6) of the battery, where the first conductive plate may include a first plate (e.g., the first plate 341 in FIG. 7) and a second plate (e.g., the second plate 342 in FIG. 7) spaced apart from the first plate, and the wire may be disposed between the first plate and the second plate.

According to an embodiment, the connection member may include a third conductive plate (e.g., the third conductive plate 344 in FIG. 9) extending from the wire and connected to the first ground area.

According to an embodiment, the wearing member may include a first case portion (e.g., the first case portions 231a and 233a in FIG. 4) configured to accommodate the circuit board, a second case portion (e.g., the second case portions 231b and 233b in FIG. 4) configured to accommodating the battery, and a connection structure (e.g., the connection structure 235 in FIG. 4) configured to interconnect the first case portion and the second case portion and accommodate at least a portion of the connection member, and the connection structure may be made of a flexible material.

It may be apparent to a person ordinarily skilled in the technical field to which the disclosure belongs that the above-described electronic device including a connection member according to the disclosure is not limited by the above-described embodiments and drawings, and may be variously substituted, modified, and changed within the technical scope of the disclosure.

What is claimed is:

1. An electronic device comprising:
   a lens frame accommodating a display member;
   a wearing member connected to the lens frame;
   a circuit board provided inside the wearing member;
   a battery provided inside the wearing member; and
   a connection member comprising:
      a first end connected to the circuit board;
      a second end connected to the battery;
      an elastic member formed of a conductive material; and
      a wire at least partially surrounded by the elastic member,
      wherein the wire is electrically separated from the elastic member, and
   wherein the battery is electrically connected to the circuit board via the elastic member and the wire,
   wherein the connection member further comprises a first conductive member connected to a third end of the elastic member and a second conductive member connected to a fourth end of the elastic member, and
      wherein the fourth end is opposite to the third end.

2. The electronic device of claim 1, wherein the circuit board comprises a first ground area,
   wherein the battery comprises a second ground area, and
   wherein the connection member interconnects the first ground area and the second ground area.

3. The electronic device of claim 2, further comprising a power management module provided on the circuit board,
   wherein the elastic member is electrically connected to the first ground area and the second ground area, and
   wherein the wire is electrically connected to the power management module and the battery.

4. The electronic device of claim 1, wherein the connection member further comprises:
   a first conductive plate extending from the first conductive member and connected to a first ground area of the circuit board; and
   a second conductive plate extending from the second conductive member and connected to a second ground area of the battery.

5. The electronic device of claim 4, wherein the first conductive plate comprises a first plate and a second plate spaced apart from the first plate, and
   wherein the wire is disposed between the first plate and the second plate.

6. The electronic device of claim 4, wherein the connection member further comprises a third conductive plate extending from the wire and connected to the first ground area.

7. The electronic device of claim 4, wherein the elastic member is electrically connected to the first conductive plate and the second conductive plate, and
   wherein the wire is insulated from the first conductive plate and the second conductive plate.

8. The electronic device of claim 1, wherein the wire is configured to transmit power provided by the battery to the circuit board, and
   wherein a current of the circuit board is configured to flow to the battery via the elastic member.

9. The electronic device of claim 1, wherein the wearing member comprises:
   a first case portion accommodating the circuit board;
   a second case portion accommodating the battery; and
   a connection structure interconnecting the first case portion and the second case portion and accommodating at least a portion of the connection member.

10. The electronic device of claim 9, wherein the connection structure is formed of a flexible material.

11. The electronic device of claim 1, wherein the elastic member comprises a coil spring.

12. The electronic device of claim 1, further comprising a connection terminal configured to receive power from an external electronic device.

13. The electronic device of claim 12, further comprising a cable structure configured to electrically interconnect the circuit board and the connection terminal,
   wherein at least a portion of the cable structure is arranged in parallel with the connection member.

14. The electronic device of claim 1, further comprising an optical output module configured to output an image by using the display member.

15. An electronic device comprising:
   a housing comprising a lens frame and a wearing member connected to the lens frame;
   a circuit board provided inside the housing;
   a battery provided inside the housing; and
   a connection member connected to the circuit board and the battery,
   wherein the connection member comprises:
      an elastic member comprising a coil spring; and
      a wire at least partially surrounded by the coil spring and configured to electrically interconnect the battery and the circuit board,
   wherein the wire is electrically separated from the elastic member; and
   wherein a first ground area of the circuit board and a second ground area of the battery are electrically interconnected by the elastic member, wherein the connection member further comprises a first conductive member connected to a first end of the elastic member and a second conductive member connected to a second end of the elastic member.

16. The electronic device of claim 15, wherein the connection member further comprises:
    a first conductive plate extending from the first conductive member and connected to the first ground area of the circuit board; and
    a second conductive plate extending from the second conductive member and connected to the second ground area of the battery,
    wherein the first conductive plate comprises a first plate and a second plate spaced apart from the first plate, and
    wherein the wire is provided between the first plate and the second plate.

17. The electronic device of claim 15, wherein the connection member further comprises a third conductive plate extending from the wire and connected to the first ground area.

18. The electronic device of claim 15, wherein the wearing member comprises:
    a first case portion accommodating the circuit board;
    a second case portion accommodating the battery; and
    a connection structure interconnecting the first case portion and the second case portion and accommodating at least a portion of the connection member, and
    wherein the connection structure is formed of a flexible material.

* * * * *